Aug. 8, 1944.  M. G. CLAY  2,355,148
ELECTRICALLY PROPELLED TRUCK
Filed Feb. 19, 1943  4 Sheets-Sheet 1

Inventor
Murray G. Clay
By [signature]
Atty.

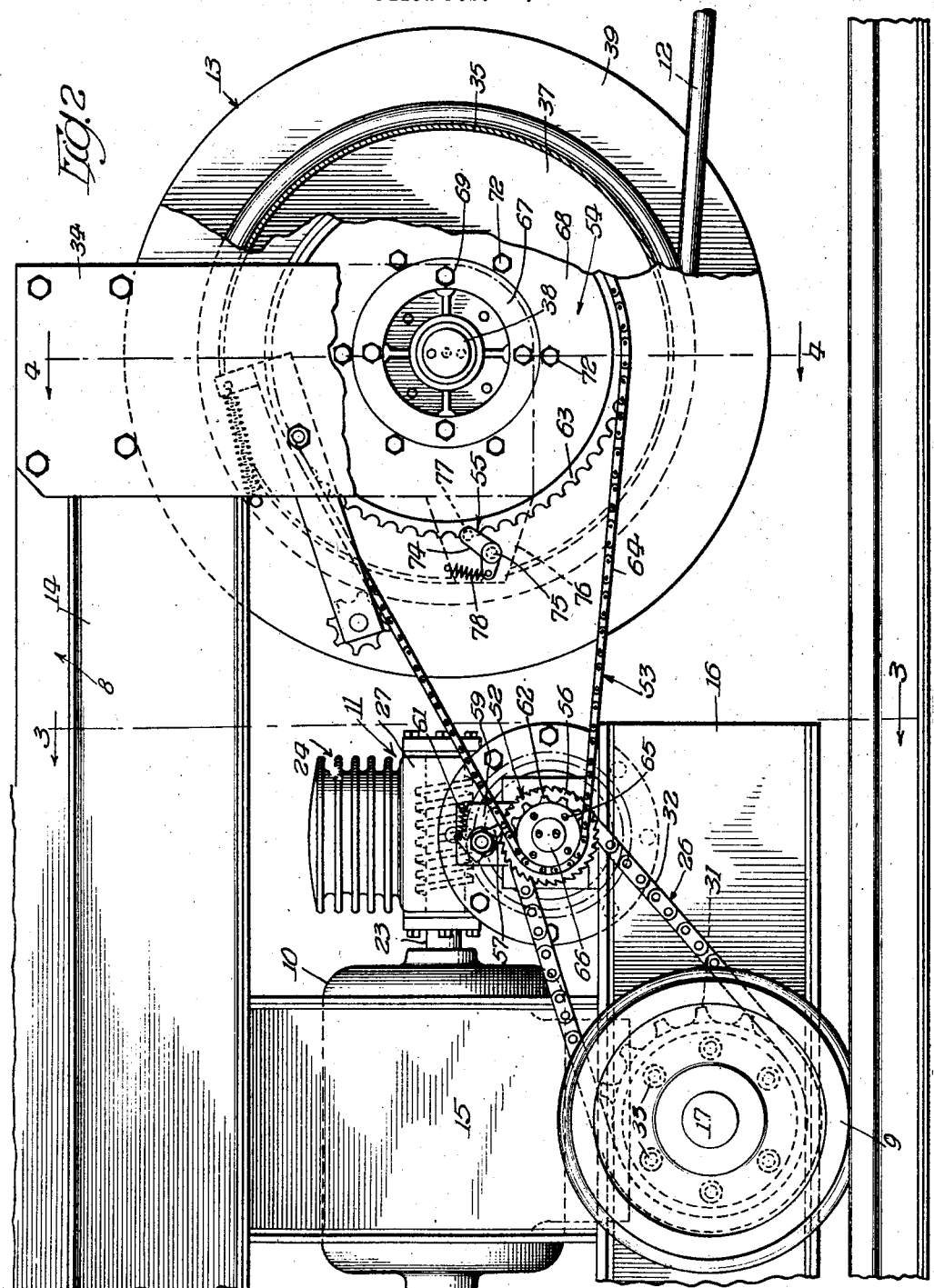

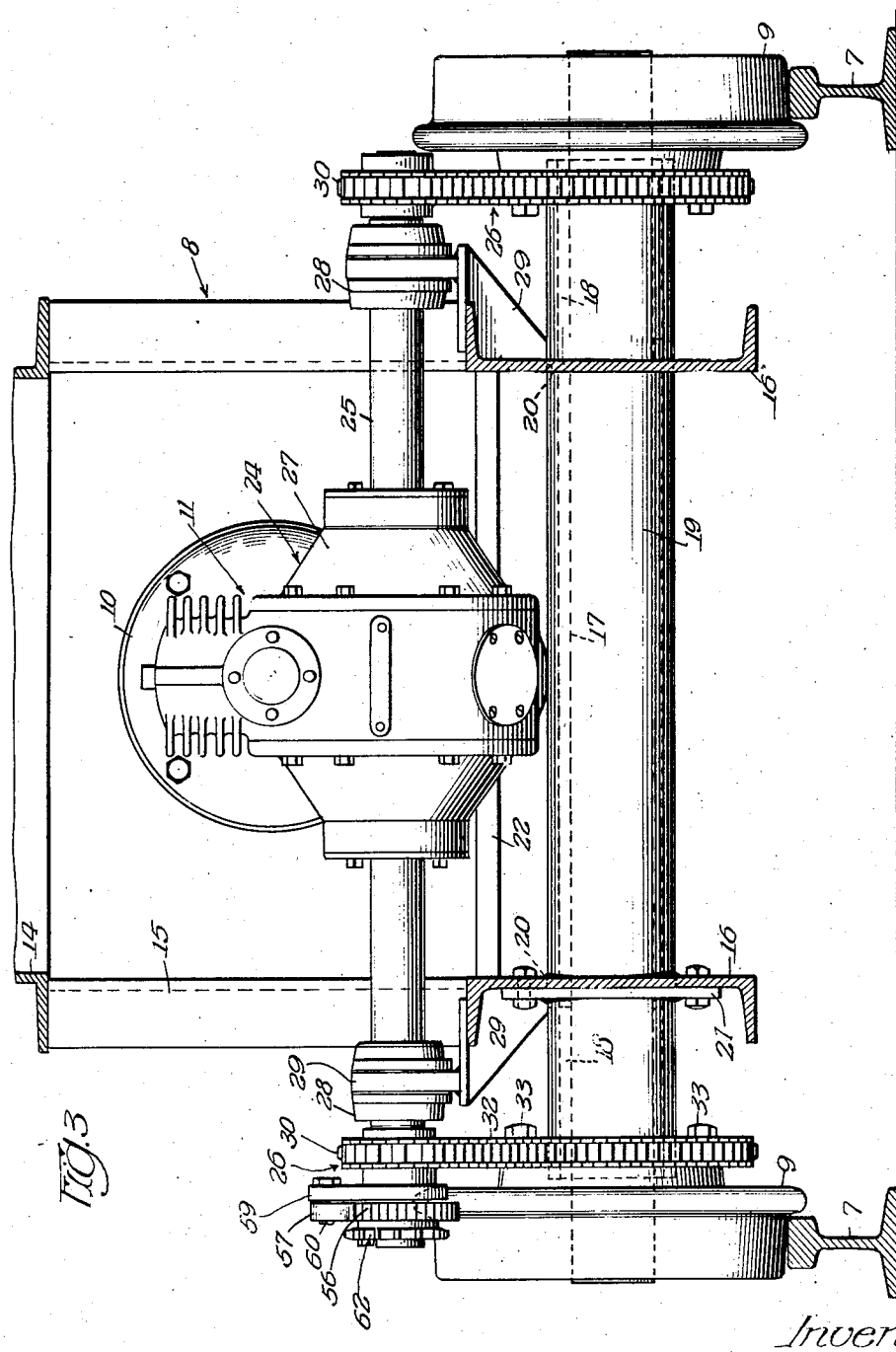

Aug. 8, 1944.   M. G. CLAY   2,355,148
ELECTRICALLY PROPELLED TRUCK
Filed Feb. 19, 1943   4 Sheets-Sheet 4
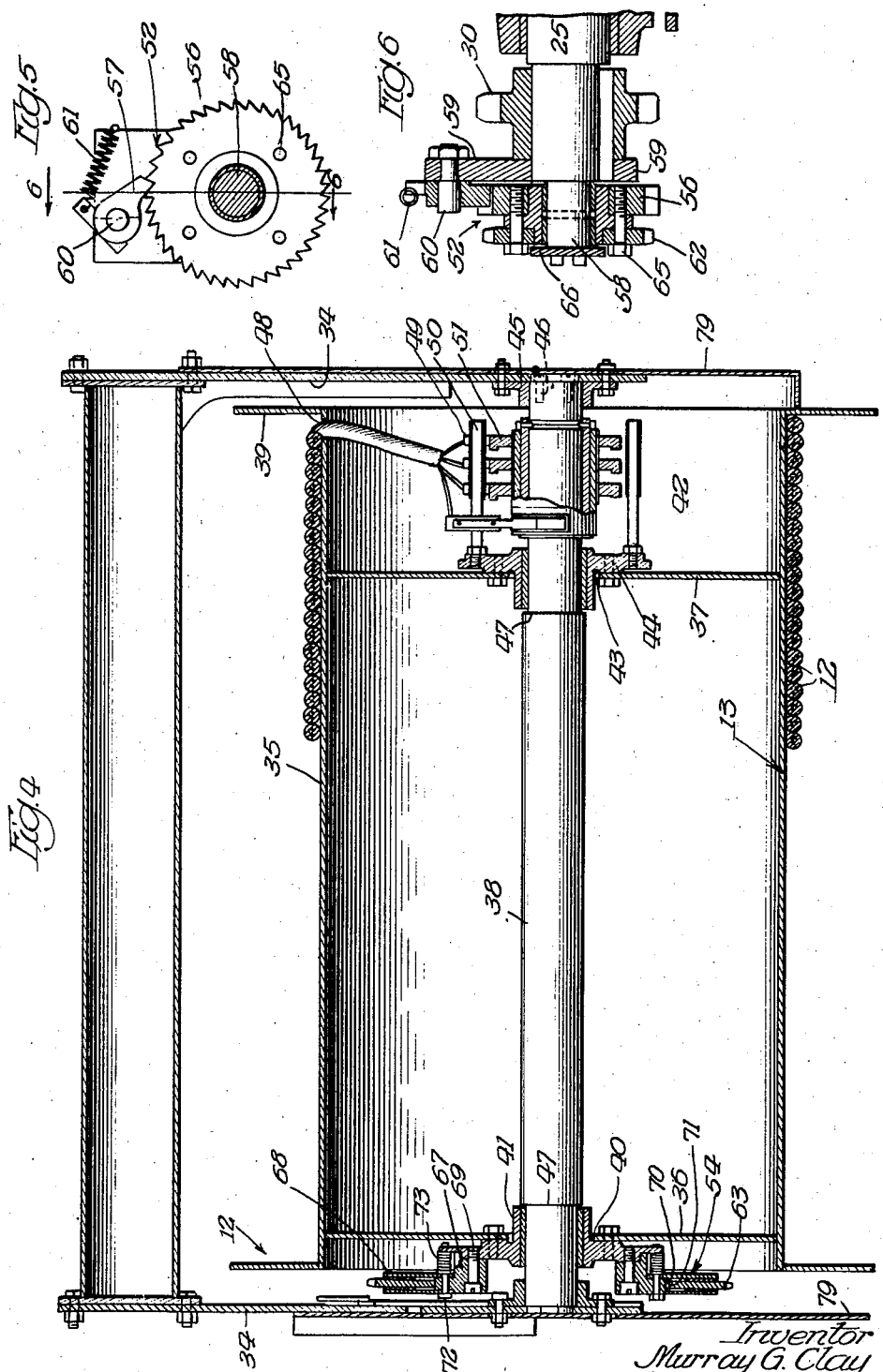
Inventor
Murray G. Clay
By Thed Gerlach Atty.

Patented Aug. 8, 1944

2,355,148

UNITED STATES PATENT OFFICE 2,355,148

ELECTRICALLY PROPELLED TRUCK

Murray G. Clay, Chicago, Ill., assignor to The Beardsley & Piper Company, Chicago, Ill., a corporation of Illinois Application February 19, 1943, Serial No. 476,474

1 Claim. (Cl. 191—12)

The present invention relates generally to trucks. More particularly the invention relates to that type of truck which is adapted to travel along a track and has mounted thereon a reversible electric motor which serves to drive the truck in either direction along the track and is supplied with current by way of a cable having one end thereof connected to a stationary or fixed source of electric current and its other end anchored to, and wound around, a rotatable reel on the truck.

In a truck of this type the reel revolves so as to pay out the cable when the truck is propelled away from the source of electric current, and is reversely revolved so as to effect wind up of the cable when the truck is propelled toward the current source.

One object of the invention is to provide a truck of the type under consideration having novel and improved mechanism for controlling operation of the cable reel.

Another object of the invention is to provide a truck of the last mentioned character in which the control mechanism for the reel maintains the cable under uniform tension at all times and includes a slip type friction clutch, the driven member of which is fixedly connected to the reel and the drive member of which is connected to the motor by a ratchet drive of such character that it is driven only in connection with propulsion of the truck toward the current source.

A further object of the invention is to provide a truck of the last mentioned character in which the mechanism for controlling the cable reel includes a ratchet for automatically locking the drive member of the clutch against drive or rotation when the truck is propelled away from the current source. When the drive member of the clutch is locked by the ratchet in connection with drive of the truck away from the current source the cable unwinds from, and rotates the reel due to slippage of the clutch, and the clutch slippage results in the application of uniform tension on the cable.

A still further object of the invention is to provide an electrically propelled truck which is generally of new and improved design or construction and is characterized by durability and exceptionally high efficiency.

Other objects of the invention and the various advantages and characteristics of the present truck will be apparent from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 2 is a fragmentary side view showing the manner in which the rotatable cable reel is supported on the truck and illustrating in detail the design and arrangement of the means for controlling operation of the reel;

Figure 3 is a vertical transverse section taken on the line 3—3 of Figure 2 and showing the arrangement of the electric motor and the manner in which the motor is connected to drive the traction wheels of the truck;

Figure 4 is a vertical transverse section taken on the line 4—4 of Figure 2 and illustrating the design and construction of the cable reel and the mount therefor and showing in detail the slip type friction clutch forming part of the mechanism for controlling operation of the reel in connection with propulsion of the truck;

Figure 5 is a side view of the ratchet drive which is included in the reel controlling mechanism and serves to drive the driven member of the clutch in connection with propulsion of the truck toward the source of current; and Figure 6 is a vertical transverse section on the line 6—6 of Figure 5.

Figure 1:
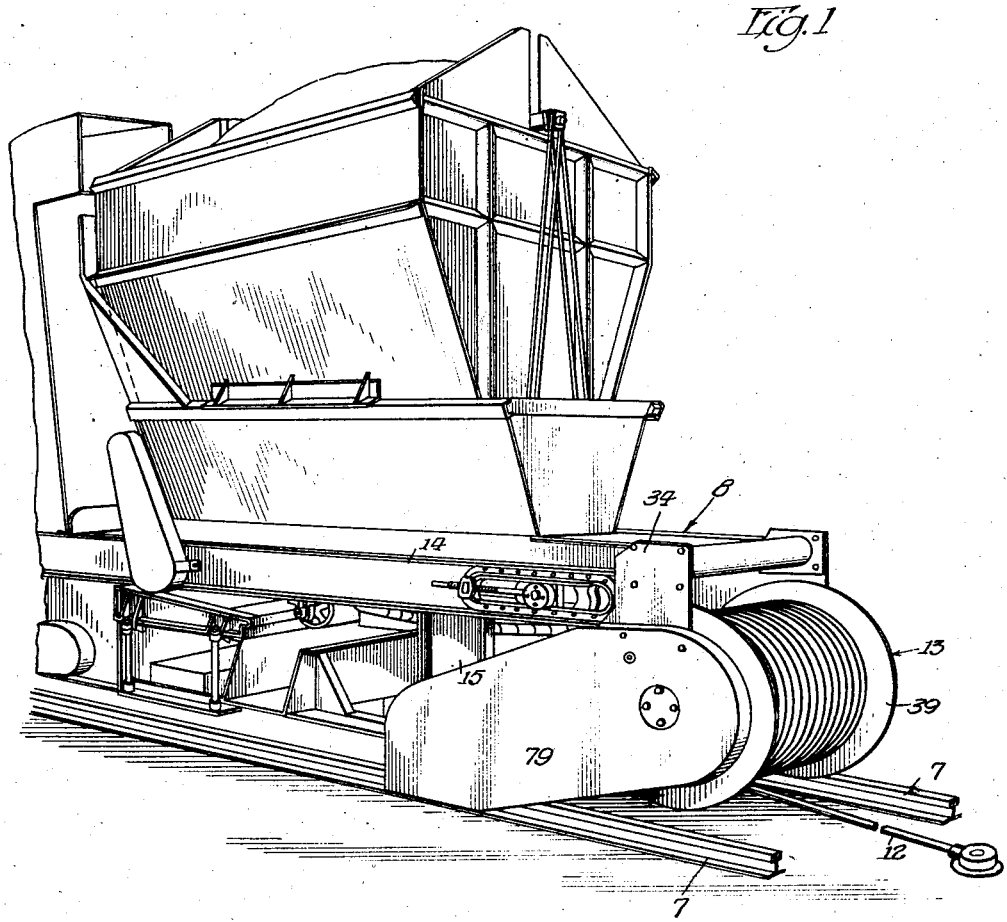
Figure 1 is a perspective of a truck embodying the invention.

The truck which is shown in the drawings constitutes the preferred form or embodiment of the invention. Although it has many capabilities of use the truck is primarily designed to form a part of a mold or flask filling machine like that disclosed in, and forming the subject matter of, United States Patent No. 1,774,076, dated August 26, 1930. Such a machine embodies in addition to the truck a sand hopper with an open bottom, a horizontally extending endless conveyor beneath the hopper, an upstanding bucket conveyor at the discharge end of the endless conveyor, and a rotary projector for forming the sand that is delivered by the bucket conveyor into wads and slinging such wads into subjacent molds or flasks, and these parts or elements are mounted on the truck. The improved truck is adapted to travel along a track in the form of a pair of parallel, laterally spaced rails 7 and comprises as its main or principal parts a rectangular, horizontal frame 8, a pair of rail engaging traction wheels 9 at the rear end of the frame, a pair of wheels (not shown) at the front end of the frame, a three phase reversible electric motor 10, gear mechanism 11 for driving the traction wheels from the motor to effect propulsion of the truck along the track, a cable 12 for supplying electric current to the truck, a reel 13 for the cable, and mechanism for controlling operation of the reel.

The frame 8 comprises a pair of parallel, laterally spaced longitudinally extending upper channel beams 14 and these are suitably cross connected. In addition to the beams 14 the frame 8 comprises a pair of vertically extending channel beams 15, and a pair of parallel, laterally spaced, longitudinally extending lower channel beams 16. The beams 15 are disposed in opposed relation and are located inwards of the rear ends of the channel beams 14. They support the channel beams 14 and have the upper ends thereof welded or otherwise fixedly secured to the bottom flanges of said channel beams 14. The lower channel beams 16 are located beneath, and are secured to, the lower ends of the beams 15. The traction wheels 9 are mounted on the ends of a horizontally extending axle 17. The latter extends transversely of the truck frame 8 and is journalled in bearings 18 which are disposed in, and carried by, a tubular member 19. The ends of the shaft 17 project beyond the ends of the tubular member 19, as shown in Figure 3. The tubular member 19 extends through a pair of aligned holes 20 in the lower channel beams 16 of the frame 8. Longitudinal displacement of the tubular member 19 relatively to the frame is prevented by a ring shaped or annular plate 21 and this, as shown in Figure 3, is welded to the tubular member 19 and is bolted to the web of one of the channel beams 16.

The electric motor 10 is located between the vertically extending channel beams 15 of the frame 8 and is supported by way of a resilient mounting (not shown) on a horizontally extending bar 22. It embodies an armature shaft 23 and is arranged so that such shaft extends lengthwise of the truck frame 8. The motor supporting bar 22 extends between, and is connected to, the upper portions of the lower channel beams 16 of the frame 8.

The gear mechanism 11 for driving the traction wheels 9 from the electric motor 10 comprises a worm and worm gear type speed reducing unit 24, a drive shaft 25 and a pair of chain and sprocket connections 26. The speed reducing unit 24 is disposed behind the electric motor 10 and comprises a housing 27 in which the worm and worm gear thereof are housed. The worm is in mesh with the worm gear and is connected to, and driven by, the armature shaft 23 of the electric motor 10. The drive shaft 25 is disposed transversely of the truck frame 8 and is supported at the ends thereof by way of a pair of bearings 28. The central portion of the drive shaft extends through the housing 27 of the speed reducing unit 24 and carries the worm gear of the unit. The bearings 28 are supported by brackets 29 on the rear ends of the lower channel beams 16 of the frame 8. The chain and sprocket connections 26 serve to drive the traction wheels 9 from the drive shaft 25 and consists of sprocket wheels 30, sprocket wheels 31 and endless chains 32. The sprocket wheels 30 are keyed or otherwise fixedly secured to the ends of the drive shaft 25 and are disposed outwards of the bearings 28. The sprocket wheels 31 surround the ends of the tubular element 19 and are connected by way of bolts 33 to the inner faces of the hub portions of the traction wheels 9. The chains 32 are trained around the sprocket wheels 30 and 31, as shown in Figures 2 and 3. When the electric motor 10 is driven in one direction the mechanism 11 operates to drive the traction wheels 9 so as to effect propulsion of the truck in one direction along the track. Reverse drive of the electric motor operates through the medium of the mechanism 11 reversely to propel the truck along the track.

The cable 12 comprises a plurality of current conducting wires within an outer wrapping, and has one end thereof connected to a stationary or fixed current source at one end of the track. The other end of the cable is anchored to, and wrapped around the reel 13.

The reel 13 is located at the rear end of the frame 8 and is disposed between a pair of vertically extending plates 34. The upper ends of these plates are connected to the rear ends of the upper channel beams 14 of the frame 8. The reel 13 comprises a cylindrical side wall 35 and a pair of circular end walls 36 and 37 and is supported rotatably by way of a shaft 38. The cylindrical side wall 35 extends transversely of the truck frame 8 and has a pair of outwardly extending rings 39 at its ends. These rings serve to hold the cable on the side wall 35 of the reel. The end wall 36 extends across, and is secured to, one end of the side wall 35 and has a hole 40 in its central portion. A hub 41 is bolted to the hole defining portion of the end wall 36. The other end wall, i. e., the end wall 37 of the reel 13, extends across, and is secured to, the other end of the cylindrical side wall 35 and is spaced inwards from the other end of said wall in order to define a compartment 42. The central portion of the end wall 37 is provided with a circular hole 43 and this is positioned in axial alignment with the hole 40 in the central portion of the end wall 36. A hub 44, like the hub 41, is bolted to the hole defining portion of the end wall 37. The reel supporting shaft 38 extends longitudinally through the central portion of the cylindrical side wall 35 and has reduced ends which extend through, and serve rotatably to support, the hubs 41 and 44. As shown in Figure 4, the reduced ends of the shaft 38 project outwards of the hubs 41 and 44 and are mounted in socket type brackets 45 on the lower portions of the inner faces of the plates 34. Cap screws 46 extend through the plates 34 and into internally threaded sockets in the reduced ends of the shaft 38 and serve to hold the shaft in fixed relation with the frame of the truck. The inner ends of the hubs 41 and 44 abut against shoulders 47 at the inner ends of the reduced ends of the shaft 38 and coact therewith to prevent axial displacement of the reel 13 with respect to the shaft 38. The end of the cable 12 that is applied to the reel 13 extends through a hole 48 in the reel side wall 35 and leads into the compartment 42. The ends of the wires at such end of the cable are electrically connected to brushes 49 which are supported on an insulated rod 50 and engage slip rings 51 on the end of the reel supporting shaft 38 that is disposed in the compartment 42. The brush carrying rod 50 is disposed in parallel relation with the reel supporting shaft 38 and is fixedly connected to the hub 44. The slip rings 51 are suitably insulated from the adjacent end of the shaft 38 and are electrically connected to the reversible electric motor 10 as well as various other electrically operated units which are mounted on, or associated with, the truck.

The mechanism for controlling operation of the reel 13 extends between the shaft 25 and the hub 41 at the central portion of the reel end wall 36. It operates to revolve or rotate the reel so as to effect wind up of the cable around the cylindrical side wall 35 thereof when the truck is propelled by the electric motor 10 in the direction of the current source. It also operates when the truck is propelled in the opposite direction, i. e., away from the current source, to permit the reel reversely to revolve and effect pay out of the cable 12. As hereinafter described, the mechanism so controls the reel that the cable is maintained under uniform tension at all times. As its main or principal parts the reel controlling mechanism comprises a one way ratchet drive 52, a chain and sprocket connection 53, a slip type friction clutch 54 and a ratchet 55. The ratchet drive 52 operates through the medium of the chain and sprocket connection 53 and the clutch 54 to drive the reel so as to effect wind up of the cable when the truck is propelled toward the source of current to which the one end of the cable is connected. It consists of a ratchet wheel 56 and a pawl 57. The ratchet wheel extends around, and is journaled on, a reduced cylindrical stem 58 on the adjacent end of the drive shaft 25. It is disposed outwards of the adjacent sprocket wheel 30. The pawl 57 is associated with, and carried by, an arm 59. This arm surrounds, and is keyed to, the adjacent end of the drive shaft 25 and projects radially therefrom. The outer end of the arm 59 is provided with a transversely extending pivot pin 60 and the pawl 57, as shown in Figures 5 and 6, is pivotally mounted on this pin, and is arranged so that it engages the teeth of the ratchet wheel 56. A tension spring 61 is applied to the pawl 57 and serves to hold the pawl in engagement with the teeth of the ratchet wheel. The pawl and ratchet wheel constituting the ratchet drive 52 are so arranged that the ratchet wheel is driven by, and rotates conjointly with, the drive shaft 25 when the latter is driven by the electric motor in connection with propulsion of the truck in the direction of the current source. When the shaft 25 is reversely driven in connection with propulsion of the truck away from the current source the ratchet wheel 56 remains stationary on the shaft 25 and the pawl 57 rotates freely around the ratchet wheel. Because of the arrangement of the ratchet wheel and pawl the reel is driven by the electric motor 10 only when the truck is propelled towards the current source. The chain and sprocket connection 53 extends between the ratchet wheel 56 and the slip type friction clutch 54 and consists of a sprocket wheel 62, a sprocket wheel 63 and an endless chain 64. The sprocket wheel 62 is mounted on the reduced stem 58 of the drive shaft 25 and is fixedly connected to the ratchet wheel 56 on the ratchet drive 52 by way of cap screws 65. A plate 66 is bolted to the outer extremity of the stem 58 and serves to hold the ratchet wheel 56 and the sprocket wheel 62 against axial displacement with respect to the stem. The sprocket wheel 63 surrounds the adjacent end of the supporting shaft 38 for the reel 13, is disposed outwards of the hub 41 and constitutes the drive member of the slip type friction clutch 54. The endless chain 64 is trained around the two sprocket wheels 62 and 63 and serves to drive the sprocket wheel 63 from the sprocket wheel 62 when the ratchet wheel 56 is driven by the pawl 57 in connection with propulsion of the truck towards the current source. The chain and sprocket connection 53 is so designed that in connection with drive thereof by the ratchet drive 52 it tends to drive the reel 13 at a slightly greater speed than it can take or wind up the cable 12. As a result of this the reel, due to action of the slip type clutch 54, slips in connection with drive thereof during propulsion of the truck towards the current supply and hence places the cable 12 under tension. The slip clutch 54 comprises a hub 67 and a pair of ring-shaped clutch plates 68. The hub is disposed outwards of the end wall 36 of the reel 13 and is connected by screws 69 to the peripheral portion of the hub 41. It is disposed in substantially the same vertical plane as the chain and sprocket connection 53 and embodies an outwardly extending annular flange 70. The latter fits within a circular hole 71 in the central portion of the sprocket wheel 63. The clutch plates 68 are disposed on opposite sides of the sprocket wheel 63 and have the inner marginal portions thereof disposed in straddled relation with the flange 70. Bolts 72 extend through the flange and said inner marginal portions of the clutch plates and serve to connect the plates and hub for conjoint rotation while at the same time permitting the plates to move sidewise to and from the sprocket wheel 63. Compression springs 73 are mounted on the shanks of the bolts 72 and serve to urge the clutch plates 68 towards one another and into frictional engagement with the sides of the sprocket wheel 63. The compression of the springs and, therefore, the resulting friction between the clutch plates 68 and the sprocket wheel 63, may be varied by adjustment of bolts 72. The hub 67 and the clutch plates 68 contitute the driven member of the slip type friction clutch 54. When the sprocket wheel 63 is over driven in connection with drive of the reel 13 for cable wind up purposes it slips relatively to the clutch plates 68. The ratchet 55 serves to lock against rotation the sprocket wheel 63 constituting the drive member of the clutch when the truck is propelled away from the source of current. It is in the form of a pawl 74. The latter is pivotally mounted on a pin 75 and this, as shown in Figure 2, is carried by a plate 76 on the lower end of the plate 34 that is adjacent the slip type friction clutch 54. The distal end of the pawl is provided with a cross pin 77 which rides on the teeth of the sprocket wheel 63. A tension spring 78 is applied to the pawl 74 and serves to hold the pin 77 in engagement with the teeth of the sprocket wheel 63. The pawl 74 constituting the ratchet 55 is so arranged that it permits the sprocket wheel to rotate in connection with drive thereof during propulsion of the truck towards the electric current source but locks the ratchet wheel 63 against rotation in connection with propulsion of the truck away from the current source. When the sprocket wheel 63 is locked by the pawl 74 during propulsion of the truck away from the current source the reel revolves due to slippage of the clutch 54 and thus permits the cable to be paid out. Because of the action of the clutch there is a drag on the reel during pay out of the cable in connection with propulsion of the truck away from the current source and hence the cable is maintained under tension. By having the cable under tension at all times it winds and unwinds freely and the part thereof that is between the reel and the current source includes no objectionable loops. A housing 79 serves to encase and protect the ratchet drive 52, the chain and sprocket connection 53 and the slip type friction clutch 54.

The operation of the truck is as follows:

When it is desired to propel the truck toward the source of current to which the one end of the cable 12 is attached the electric motor 10 is operated so as to effect proper drive of the traction wheels 9 through the medium of the speed reducing unit 24, the drive shaft 25 and the chain and sprocket connections 26. As soon as drive of the shaft 25 commences the ratchet drive 52 operates through the medium of the chain and sprocket connection 53 and the slip type friction clutch 54 to drive the reel 13 so as to effect wind up of the cable 12 therearound. Because the sprocket wheel 63 is driven at a speed in excess of the cable take up speed of the reel the reel slips with respect to the sprocket wheel 63 and hence causes winding of the cable 12 under tension. During a cable winding operation in connection with propulsion of the truck towards the current source the pawl 74 constituting the ratchet 55 slides over the teeth of said sprocket wheel 63. When it is desired to propel the truck away from the current source the electric motor 10 is driven so as to effect proper drive of the traction wheels 9. When the drive shaft 25 is driven in connection with propulsion of the truck away from the current source there is no drive of the chain and sprocket connection 53 due to the arrangement of the ratchet drive 52, and the sprocket wheel 63 is locked against rotation by the action of the pawl 74 constituting the ratchet 55. During travel of the truck away from the current source the reel 13, as previously pointed out, revolves for cable paying out purposes due to the slip action of the friction clutch 54.

The herein described truck possesses a high degree of efficiency due to the action and operation of the mechanism for controlling the cable supporting reel and such mechanism is characterized by the fact that at all times it maintains the cable under uniform or constant tension.

Whereas the truck has been described as being primarily designed for use in connection with a flask filling machine of the type forming the subject matter of Patent No. 1,774,076 it is to be understood that it may be employed in many other capacities. It is also to be understood that the invention is not to be restricted to the details set forth since these may be modified within the scope of the appended claim without departing from the spirit and scope of the invention.

Having thus described my invention what I claim as new and desire to secure by Letters Patent is:

A truck adapted to travel along a track and comprising a frame with track engaging wheels, a reversible electric motor mounted on the frame and connected to certain of the wheels so that it operates when driven in one direction to propel the truck in one direction along the track and when driven reversely to propel the truck in the opposite direction along the track, a reel rotatably mounted on said frame, a cable for supplying current to the motor, having one end thereof adapted for connection to a fixed source of current adjacent the track and its other end anchored to, and wound around, the reel, a slip type friction clutch disposed adjacent one end of the reel and embodying a drive member in the form of a sprocket wheel and in addition a driving member connected fixedly to the reel, means including a ratchet drive connected to be driven by the motor when the latter is driven so as to propel the truck towards the source and also including an endless chain connected for drive by said ratchet drive and extending around the sprocket wheel, and operative when driven to drive the sprocket wheel constituting the drive member of the clutch so as to revolve the reel for cable take up purposes, and a spring pressed pawl applied to the teeth of the sprocket wheel and arranged to lock said sprocket wheel against reverse drive.

MURRAY G. CLAY.